Oct. 16, 1945.  S. S. BROWN  2,386,930
MOTOR CONSTRUCTION
Filed March 16, 1944

INVENTOR
STEFFEN S. BROWN,
BY
Toulmin & Toulmin
ATTORNEYS

Patented Oct. 16, 1945

2,386,930

UNITED STATES PATENT OFFICE 2,386,930

MOTOR CONSTRUCTION

Steffen S. Brown, Dayton, Ohio, assignor to The Brown-Brockmeyer Company, Dayton, Ohio, a corporation of Ohio Application March 16, 1944, Serial No. 526,671

2 Claims. (Cl. 172—120)

The present invention relates to electric apparatus and more particularly to rotors for alternating current induction motors.

In the fabrication of a squirrel cage rotor, it is customary to form the rotor around laminated steel punchings with holes in their outer periphery in which copper or brass bars are inserted. After assembly, the ends of these bars are secured together through a so-called "end ring," usually made of copper, so that the bars and ring constitute a short circuited structure of extremely low resistance.

Each end ring, of which there are two or more, is usually provided with a plurality of openings which receive the copper or brass bars of the rotor and the end of these bars is welded or soldered to the outside surface of the ring. This end ring has a radial distance approximately the same size as that of the laminations and the laminations and end ring ordinarily extend inwardly as far as the shaft on which the rotor is mounted.

There are a number of defects in the construction and operation of a rotor of this type. In the first place, considerable work has to be done on each end ring, i. e., in giving the ring the proper outside diameter and in punching the equidistantly spaced holes for the rotor conductors. It will be understood that if these openings are appreciably larger than the size of the conductors, the end ring will fail to make contact with the conductors at the openings and thus increase the resistance of the rotor as a whole. On the other hand, if the holes are such as to provide too snug a fit with the rotor conductors, it is difficult to assemble the end rings on the rotor. The step of welding or soldering the ends of the conductors to the outer surface of the end rings also represents considerable work. Perhaps the chief difficulty of the prior art type of rotor is in the fact that even when the conductors are soldered to the end ring a low resistance contact is not always obtainable between the conductors and end ring because the solder or the solder flux may develop at the joints which brings about poor electrical contact.

If all of the joints are not perfect, the resistance of the rotor may be substantially increased so that the rotor will not have the ability to come up to speed and will contain unbalanced currents which add to the heating effects.

The primary object of the invention is to provide an improved form of rotor which lends itself to ease of manufacture of the parts and facility of assembly, thus resulting in a less expensive construction.

A more specific object is to provide an improved end ring structure of a squirrel cage rotor which will eliminate all possibility of poor joints and therefore will assure a rotor of sufficiently low resistance as will permit the motor to come up to speed without excessive slip.

A still further object is to provide a rotor construction of the end ring type in which the punched or apertured form of end ring is eliminated.

The invention will be better understood when reference is made to the following description and the accompanying drawing, in which.

The core of the rotor is constituted of a plurality of round laminated steel punchings indicated at 1 provided at their peripheries with aligned openings for receiving rods or bars 2 of copper, brass or other conducting material. These bars, which are equidistantly spaced about the periphery of the rotor, have a length somewhat longer than the thickness of the assembled laminations so that an appreciable portion indicated at 3 extends beyond the outer surfaces of the rotor.

The end ring 4 as formed in accordance with my invention is made of copper or brass of any suitable cross-sectional shape having an area sufficient to carry the currents induced within rotor when the motor is operating. It is apparent that the cross-sectional area of each ring 4 determines in part the resistance of the rotor so that the size of these rings and the cross-sectional shapes may be varied to give any desired resistance in order to produce a motor of the proper characteristics. Thus, the improved rotor construction provides a simple means for varying the characteristics of the motor.

Figure 1:
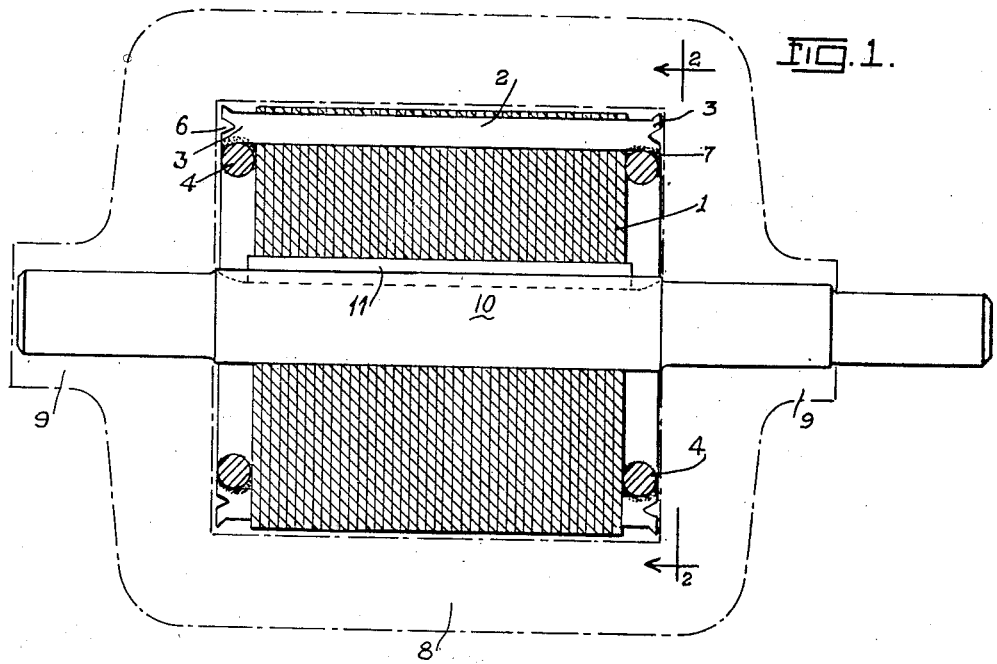
Figure 1 represents a longitudinal section of the improved rotor mounted on a shaft shown in elevation.
Figure 2:
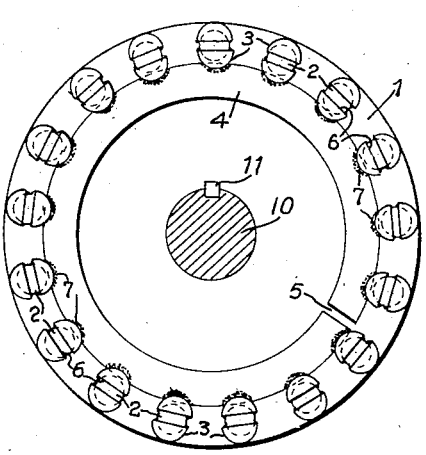
Figure 2 is an end elevational view of the rotor taken along line 2—2 in Figure 1, and cutting across the shaft which is shown in section.

The end rings of which there may be two, are bent to a circular configuration and have a peripheral length slightly less than that necessary to form a continuous body when the ring is fitted snugly against the interior surfaces of the rod extensions 3. It is apparent that if a small space indicated at 5 in Figure 2, is left between the ends of the conductor 4, a small wedging tool may be inserted into the space to force the end ring outwardly and solidly against the inner surfaces of the longitudinal conductors or bars 2. It is apparent that the extensions 3 of the bars 2 project beyond the end surfaces of the rotor 1 to a distance in line with the outermost surface of the end rings 4.

In order to secure each end ring to the bars 2, a peening chisel may be presented to the ends of the bar extensions 3 as indicated by the slots 6 and these ends are peened over or parted at each side so as to wedge the inner parted portion of each bar against the ring. If the latter has been fitted tightly against the end portions of each bar either by closeness of fit or by the wedging effect introduced at the space 5, the peening action is usually sufficient to assure a perfect electrical contact between the bars and the end ring. However, it may be desirable to weld the joint between the inner peened edges of the bars and the outer end surface of each end ring as indicated at 7. Thus, by making a firm contact between the bars 2 and the end ring due to the peening or wedging operation, and then assuring the permanency of this contact by the weld 7 the joints between the bars 2 and each ring maintain a metal to metal contact. The squirrel cage portion of the rotor therefore has extremely low internal resistance, readily permitting the flow of currents induced therein by the field (not shown) which surrounds the rotor.

The frame of the motor is indicated by the dot-dash outline 8 and this frame may contain the usual form of single phase or polyphase field winding for inducing currents in the squirrel cage rotor as is well understood in the art. The frame is provided at each end with suitable bearings 9 in which a shaft 10 is journaled. The rotor 1 may be keyed to the shaft as indicated at 11.

From the foregoing, it is evident that I have disclosed an improved form of squirrel cage rotor having end rings and in which these rings are formed of round stock, brass or copper, bent to a circular configuration and of a size as will fit tightly against the inner surfaces of the longitudinal bars of the rotor. The actual construction of these rings and their assembly within the rotor, also the manner of fastening the rings to the longitudinal bars are so simple that the work can be performed by unskilled labor without the slightest danger of introducing loose joints which give rise to increase resistance in the motor.

Having thus fully described my invention, what I claim as new and desire to secure by Letters Patent is:

1. A squirrel cage rotor comprising a plurality of stacked laminations, a plurality of equidistantly spaced openings extending longitudinally of the stack, inductor bars fitting said openings fairly snugly and extending beyond at least one end of the stack, an end ring formed of round stock and bent to circular shape, said ring being positioned within the confines of the extended ends of said bars and contacting with the bars, said bars being longitudinally split to form parted portions whereby good contact between said ring and bars is obtained and the ring securely held in position.

2. A squirrel cage rotor comprising a plurality of stacked laminations, having equidistantly spaced openings extending longitudinally of the stack, inductor bars in said openings and extending beyond at least one end of the stack, an end ring of circular configuration positioned solely within the confines of the extending ends of said bars and contacting said bars, said bars being longitudinally split to form parted portions of which one of the parted portions of each bar is caused to bear tightly against the end ring in order to secure said ring in position and to make firm electrical contact thereof.

STEFFEN S. BROWN.